May 26, 1953 C. H. O. BERG 2,640,019
OIL-SHALE EDUCTION APPARATUS
Filed June 1, 1948 2 Sheets-Sheet 1

INVENTOR.
CLYDE H. O. BERG.
BY Ross J. Garofalo
ATTORNEY.

May 26, 1953 — C. H. O. BERG — 2,640,019

OIL-SHALE EDUCTION APPARATUS

Filed June 1, 1948 — 2 Sheets—Sheet 2

INVENTOR.
CLYDE H. O. BERG.
BY Rosa J. Garofalo
ATTORNEY.

Patented May 26, 1953

2,640,019

UNITED STATES PATENT OFFICE 2,640,019

OIL-SHALE EDUCTION APPARATUS

Clyde H. O. Berg, Long Beach, Calif., assignor to Union Oil Company of California, Los Angeles, Calif., a corporation of California Application June 1, 1948, Serial No. 30,423

6 Claims. (Cl. 202—95)

This invention relates to a process and apparatus for the continuous treatment of carbonaceous solids for the recovery of gas and liquid products therefrom and in particular is directed to a process and apparatus for the recovery of hydrocarbon gases and liquids from such carbonaceous solids as oil shale, tar sand, diatomite, various types of coal such as bituminous and sub-bituminous coals, and the like.

The recovery of hydrocarbon gases and liquids from oil-bearing or oil-producing solids is well known, and according to the previously proposed processes this recovery is generally accomplished by subjecting the solid to sufficiently high temperatures to separate the oils and gases from the mineral matter. These conventional processes have not been particularly satisfactory since in general considerable quantities of heat are required which often consumes the entire quantity of gas produced during the eduction process and sometimes considerable electrical energy as well. In addition, a large number of the conventional processes are unable to treat oil-bearing or oil-producing solids which are finely divided thus requiring a considerable contact time to effect an eduction of appreciable quantities of oils and gases from these necessarily large solid particles. Higher temperatures are also required in order to minimize the lengthy contact time necessary and as a result an undesirably large proportion of the educted oil produced is thermally decomposed destroying a large proportion of the higher molecular weight and higher-boiling substances.

The improved process of the present invention comprises a procedure for treating oil-bearing solids by means of which most of the heretofore objectionable features of the conventional processes are eliminated. The present invention further comprises an improved apparatus for the treatment of oil-bearing or oil-producing solids which is much improved over the conventional apparatuses in its simplicity of construction and operation.

It is a primary object of the present invention to provide an improved process for the recovery of gaseous and liquid products from oil-bearing or oil-producing solids in which such products are recovered at temperatures below those at which thermal pyrolysis occurs and under conditions conducive to minimizing undesirable decomposition of the liquid fraction of the products in particular.

Another object of the present invention is to provide an improved process for the recovery of hydrocarbon gases and liquids from carbonaceous solids in which carbonaceous solids of small particle size may be efficiently treated.

An additional object of the present invention is to provide a process for the recovery of shale oil and shale gases from oil shale, the operation of which is substantially as efficient when performed on oil shales of high oil content as when performed on shales of low oil content.

It is a further object of this invention to provide an improved process in which a considerable improvement in the recovery of normally liquid hydrocarbon products from the eduction gases is effected by the use of elastic mechanical vibrations.

It is also an object of this invention to provide a process for recovering oils and gases from such as oil shales in which the mineral residue is heated to fusion temperatures following eduction and in which slagging may be controlled by varying the oxygen concentration of the reactant gases.

An additional object of the present invention is to provide an improved process in which the ash slagging problems arising during the treatment of oil shales containing relatively high oil contents and the ash dusting problems arising during treatment of oil shales containing relatively low oil contents are substantially eliminated through the use of an improved method of agitating the solids as hereinafter more fully described.

Another object of the present invention is to provide an improved apparatus for the recovery of gaseous and liquid eduction products from carbonaceous solids such as oil shale containing particles smaller than about 50 mesh.

An additional object of this invention is to provide an improved apparatus which is particularly well adapted to the recovery of hydrocarbon gases and oils by the eduction of oil shale, and the like, in which heat is supplied solely from the combustion of at least a part of the carbonaceous spent shale remaining after the hydrocarbon oil and gases have been educted.

It is a further object of this invention to provide an apparatus for oil shale eduction by means of which a substantially complete recovery of shale oils and gases may be effected from oil shales regardless of the oil content of the oil shale feed.

Other objects and advantages of the present invention will become apparent to those skilled in the art as the description thereof proceeds.

Briefly, the present invention comprises a process and apparatus for the recovery of gaseous and liquid products from oil-bearing or oil-producing solids. This process is particularly well adapted to treatment of oil shales. The carbonaceous solid is introduced into a hopper zone and is subsequently passed through a seal of liquid eduction product into a feeder zone substantially without the simultaneous introduction of air therewith. The solids are then passed upwardly through a treating zone containing an eduction zone and a burning zone. In the eduction zone the oil shale is directly and countercurrently contacted with a hot eduction medium which effects the substantially complete eduction of gaseous and liquid products from the solid leaving a combustible carbonaceous residue. The carbonaceous residue is subsequently contacted with an oxygen-containing gas in the burning zone and a substantially complete combustion of the carbonaceous material is effected forming the hot eduction medium previously mentioned and leaving a carbon-free ash. The solids in the ash zone and in the burning zone are continually agitated for purposes of facilitating gas preheating, temperature control, and the elimination of difficulties arising from ash slagging in the burning zone. The ashes are discharged from the upper portion of the treating zone.

The oxygen-containing gas is drawn downwardly in counter-current contact with the ashes and is subsequently introduced into the burning zone. The hot eduction medium formed in the burning zone is drawn downwardly through the eduction zone. The gaseous and liquid products of eduction and products of combustion are disengaged from the upwardly moving bed of solids and pass into an accumulation zone comprising a shell surrounding the lower portion of the treating zone. In this accumulation zone, which communicates with the hopper zone previously described, the gases and liquids are separated and a level of liquid eduction products is maintained forming the seal mentioned above through which the oil-producing solids are introduced. Gaseous and liquid products formed in the treating zone may be withdrawn from the accumulation zone together, or they may be withdrawn as independent gas and liquid phases.

The process of this invention, as above briefly described, may be applied to the recovery of hydrocarbon gases and oils from oil shales and other oil-producing solids, from tar sands, diatomite, and other oil-containing solids, from such other carbonaceous materials as bituminous coal. The process of this invention may also be applied to the recovery of hydrocarbon oils and gases from carbonaceous solids such as coal in which an incomplete combustion of the carbonaceous residue is performed for the production of coke which is removed from the upper portion of the treating zone mentioned above. If desired, the apparatus of this invention may be operated under superatmospheric pressure under conditions conducive to the reaction of oxygen, water vapor, and carbon dioxide with the carbonaceous residue for the formation of substantial quantities of carbon monoxide and hydrogen in addition to the hydrocarbon gaseous and liquid products as described above. In this modification the carbonaceous residue is gasified with the formation of a gaseous mixture which is well suited to use as a feed stream in the well known catalytic processes for carbon monoxide hydrogenation.

The accompanying drawings are included to facilitate description of the process and apparatus of this invention and to show with clarity its mechanical construction and fully depict the precedures for its operation.

Figure 1 comprises a schematic flow diagram and vertical cross section of the apparatus involved in the process of this invention for the treatment of carbonaceous solids.

Figure 1:
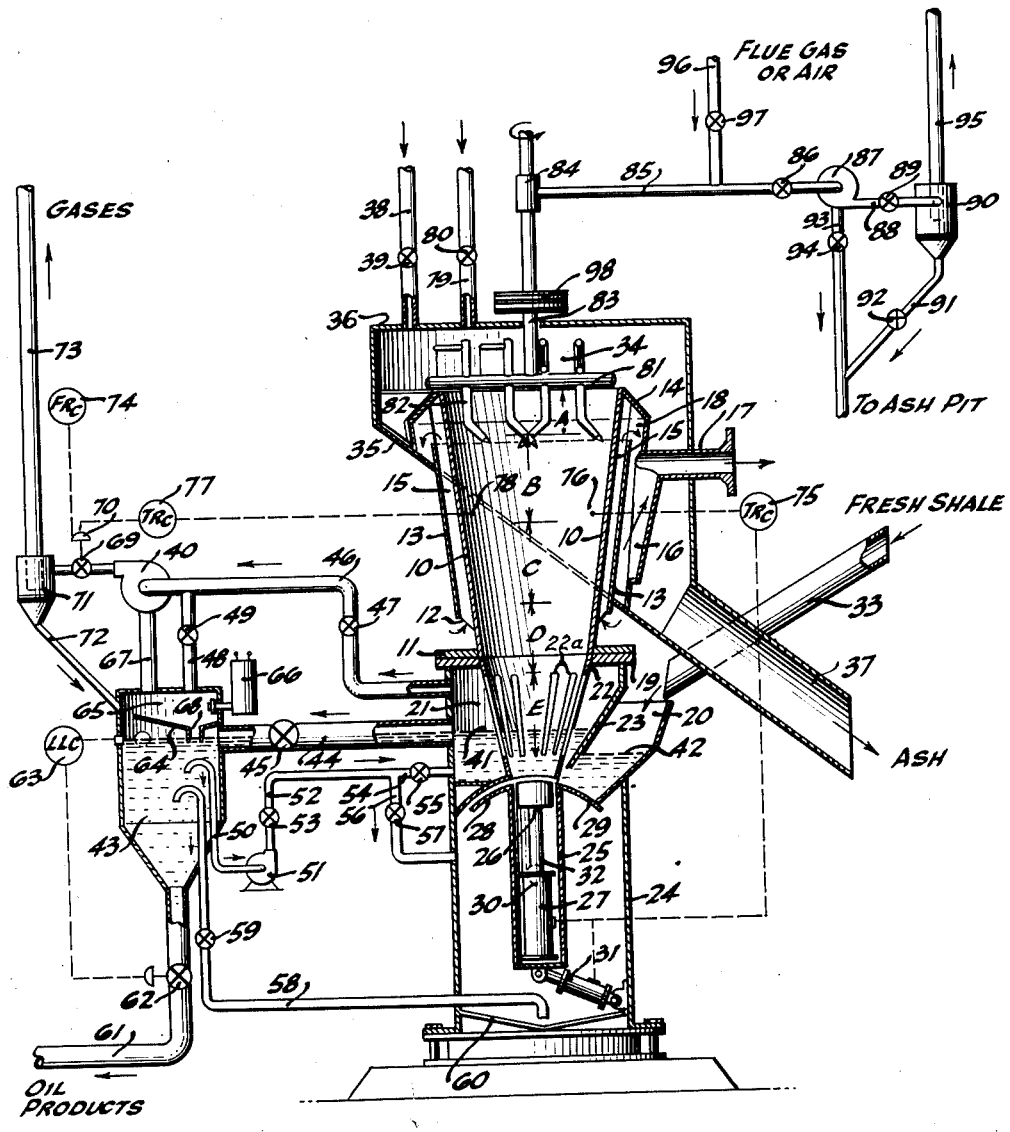

Referring now more particularly to Figure 1, conical treating kiln 10 is shown with the larger diameter at the top. Kiln 10 is open at its upper end where ashes and other residues are removed. It is further provided with radial fins 12 on the outside surface and with shell 13 extending around the outward edges of fins 12. An annular gas space 15 is thus provided between kiln 10 and shell 13 through which a gas such as air or other fluid medium may be circulated to facilitate cooling of the walls of the kiln and to maintain on the inner surface of kiln 10 a relatively cool layer of shale, at a temperature below about 400° F. Collar 14 is integrally attached to the upper end of kiln 10 and extends downwardly outside of shell 13 to reverse the flow of gases passing upwardly through space 15. Manifold 16 is further provided together with outlet 17 so that the cooling gases enter jacket 15 just above flange 11, pass upwardly between the radial fins through jacket 15, reverse direction at the upper end of jacket 15 below collar 14, and are collected in space 18 from which they are removed by means of manifold 16 and discharged through line 17. Gases passing through jacket 15 in the manner described preferably comprise atmospheric air moved by natural convection, although forced convection may be employed, if desired. This is not necessary under normal operation in which oil shale is the oil-producing solid being treated. The warm gases thus produced leave line 17 at a temperature above about 250° F. and may be employed as preheated air to furnaces, for introduction into the kiln as an oxygen-containing gas to effect burning of carbonaceous materials therein, or other uses.

Flange 11 faces directly upon flange 19 by means of which the upper structure of the apparatus is attached to the lower part of the structure. The lower part of the structure is, in the modification shown, essentially cylindrical except for hopper zone 20 through which fresh oil-bearing or oil-producing solids to be treated are introduced. Conical section 22 is provided with apertures 22a to form disengaging zone E by means of which gases and liquids may be removed from the inside of treating kiln 10 into accumulation zone 21. Conical section 22 is aligned on the same axis as treating kiln 10. Baffle 23 is positioned between accumulation zone 21 and hopper zone 20 and this baffle extends downwardly into a body of liquid maintained in the lower portion of accumulation zone 21. A liquid seal is thus provided which permits passage of liquid below baffle 23 between accumulation zone 21 and hopper zone 20 but prevents the introduction of air or other gases from hopper zone 20 into kiln 10 along with the oil-bearing solids to be treated. The presence of this liquid seal is highly important since the formation of dangerous mixtures of air and hydrocarbon or other combustible gases is thus prevented.

Positioned immediately below hopper zone 20 and accumulation zone 21 is solids feeder housing 24, which is filled with liquid products of eduction, water or other. Within this zone is submerged a mechanical feeding mechanism adapted to the removal of oil-forming or oil-bearing solids from hopper zone 20 and the discharge of these solids upwardly through conical section 22 and through the other zones of vertical treating zone 10 as hereinafter more fully described. The particular apparatus which has been found well adapted to perform this continuous introduction of solids is shown in the drawing. This vertical acting solids feeder comprises cylinder 25 provided with piston 26 actuated by hydraulic cylinder 27. Guards 28 and 29 are further provided to seal the lower openings of conical section 22 and hopper zone 20 as cylinder 25 oscillates back and forth from its vertical position below conical section 22 to its angular position below hopper 20 about trunnion 30. To effect this oscillatory motion of cylinder 25 of the vertically acting feeder, hydraulic cylinder 31 is provided. The action of hydraulic cylinders 25 and 31 is synchronized by pilot valves positioned adjacent to cylinders 27 and 31 and which actuate a master hydraulic cylinder, not shown, which in turn controls the introduction and removal of the hydraulic fluid with hydraulic cylinder 27 so that the following sequence of events in the solids feeder will occur:

1. Hydraulic cylinder 31 rotates cylinder 25 about trunnion 30 from the position shown to its angular position below hopper 20 while guard 28 seals the lower opening of kiln 10.

2. Hydraulic cylinder 27 lowers piston 26 in cylinder 25 leaving a free space in the upper portion of cylinder 25 which accepts a charge of solids from hopper 20.

3. Hydraulic cylinder 31 acts to restore cylinder 25 to its vertical position below eduction kiln 10 while guard 29 seals the lower opening of hopper 20, and 4. Hydraulic cylinder 27 acting through connecting rod 32 forces piston 26 upwardly through cylinder 25 thereby injecting the solids upwardly through conical section 22 and displacing the remaining solids upwardly through kiln 10, thus repeating the cycle.

This mechanical solids feeder is more clearly described, illustrated and claimed in copending patent application Serial No. 752,757 filed June 5, 1947.

The remainder of the description of the apparatus shown in this figure, Figure 1, will be conducted as a practical example in which the oil-bearing or oil-producing solid comprises oil shale which may contain as low as about 10 gallons of oil to as high as about 75 or 100 gallons of oil per ton of fresh oil shale. The quantity of oil which may be produced from a particular oil shale determines somewhat the mode of operation of the kiln as hereinafter more fully described.

Oil shale is continuously introduced by means of conduit 33 into hopper zone 20 wherein it is saturated with the liquid products of eduction maintained as a seal in the bottom thereof. By means of the mechanical feeder described above, the fresh oil shale is passed from hopper zone 20 upwardly through the treating zone which comprises vertical kiln 10 and conical section 22 which are positioned on the same vertical axis and communicates with one another. The fresh oil shale is passed upwardly through the treating zone successively through disengaging zone E, solids preheating zone D, eduction zone C, burning or combustion zone B, and ash zone A. The ash present in ash zone A and the burning material in zone B is continuously agitated by means of a rotary agitating mechanism 34 hereinafter more fully described and displaced from the upper portion of kiln 10 from which they fall to impinge toward the upper surface of baffle 35. Baffle 35 comprises the lower surface of agitator housing 36 which encloses the entire upper portion of the apparatus and from the lower portion of which conduit 37 is provided. The slope of baffle 35 is sufficient to cause the displaced ashes to slide freely through conduit 37 for introduction into any suitable apparatus, not shown, for disposal or other use.

An oxygen-containing gas such as air, oxygen-enriched air, or flue gas containing excess oxygen and the like is introduced into agitator housing 36 by means of line 38 controlled by valve 39. This may be heated air previously circulated through space 15. This gas may be introduced under pressure by means of a blower, not shown, or in the preferred modification is drawn downwardly through eduction kiln 10 by blower 40 which evacuates gases accumulating in the upper portion of accumulation zone 21. This method of operation gives rise to the formation of a difference in liquid levels 41 and 42 across baffle 23 forming the seal previously mentioned through which oil shale may be introduced without contaminating the gases in accumulation zone 21 with air.

The oxygen-containing gas such as air, passes downwardly through ash zone A in direct countercurrent contact thus cooling the ashes and preheating the air. The thus preheated air passes into burning zone B in which the carbonaceous residue remaining following eduction of shale oil and gases in eduction zone C is burned. The ash passing upwardly through zone B to zone A is substantially carbon free and the hot flue gases formed comprise a hot eduction medium which passes directly down into eduction zone C.

The hot eduction medium countercurrently contacts the upwardly rising oil shale, heating it to eduction temperatures of between 500° F. and 1,000° F., thereby educting substantially all of the shale oils and shale gases from the rich oil shale leaving a spent shale as a carbonaceous residue. In general, this oil and gas eduction takes place at temperatures between about 600° F. and 800° F., temperatures which do not cause undue thermal decomposition of the hydrocarbon and other products educted from the oil shale. These educted liquids and gases pass downwardly from eduction zone C together with the cooled eduction medium, products of combustion, and enter zone D while the spent carbonaceous shale residue continues upwardly into zone B where the burning of carbonaceous materials form additional quantities of the hot eduction medium.

The products of combustion and liquid and gaseous products of eduction pass downwardly through preheating zone D countercurrent to the upwardly rising oil shale. Since the gases and liquids contact the solids directly a highly efficient interchange of heat is effected in which the gases are cooled and additional liquids are condensed as well as subcooling the liquid products educted in zone C. In this direct contact the upwardly rising oil shale is preheated to temperatures as high as 300° F. to 500° F. at which temperature they enter eduction zone C.

The cooled gaseous and liquid products of combustion and eduction pass downwardly into disengaging zone E previously described which comprises a perforated conical section 22 adapted to the upflow of oil shale and adapted to disengaging liquids and gases from the upwardly moving bed of solids. These liquids and gases pass for disengaging zone E directly into accumulation zone 21 establishing liquid level 41 therein and liquid level 42 in hopper 20.

An important feature of the operation of the feeder mechanism in conjunction with conical section 22 is the fact that a continuous recirculation of fines is accomplished. These materials are the particles which are sufficiently small to drop through perforations 22a in conical section 22 into accumulation zone 21. The smaller fines do not settle readily from the oil and are removed with it while the large particles settle and are recirculated with the feed. The oil shale is wet with liquid products of eduction and some of these fines are lifted upwardly therewith through the treating zone. The action of the vertical acting solids feeder enhances the ability of the apparatus to treat oil shales containing an appreciable quantity of fines due to its vertical displacement of solids continuously in an upward direction. Those larger fines which tend to settle out of the treating zone and those which pass through perforations 22a into accumulation zone 21 and hopper zone 20 and settle rapidly to the bottom thereof are reintroduced by the feeding mechanism upwardly through the treating zone with the next charge of shale passed from hopper zone 20 upwardly through conical section 22. Zone 21 may be provided with a conical or otherwise sloping bottom to enable the settling fines to progress toward the bottom of hopper 20 so they may be reintroduced with the feed.

The lower portion of accumulation zone 21 as well as the entire inner volume of housing 24 surrounding the feeder mechanism is filled with liquids which are preferably the liquid products of eduction. In this manner, the temperature of the lower portion of the apparatus is kept well below eduction temperatures, such as from about 1000° F. to about 300° F.

A partial separation of the gaseous and liquid products is effected in accumulation zone 21 and these separated phases may be withdrawn individually or together as desired. In one modification of the present invention reservoir 43 is provided which communicates with accumulation zone 21. The liquid and gaseous products in accumulation zone 21 are drawn into the reservoir 43 by means of line 44 controlled by valve 45 under the influence of blower 40. In this modification the gas and liquid phase are removed from accumulation zone 21 together. However, if desirable, the gas products may be drawn from accumulation zone 21 under the influence of blower 40 by means of line 46 controlled by valve 47 in which case the liquid products flow from accumulation zone 21 into reservoir 43 under their own fluid head. In this latter modification line 48 connecting blower 40 with reservoir 43 is shut off by closing valve 49.

The liquid eduction products collect in reservoir 43 and establish a level approximately equal to that present in accumulation zone 21. The liquid level in reservoir zone 43 is maintained by level control 63 which in turn controls the liquid level 41 in accumulation zone 21 since the two zones directly communicate with one another through line 44 or line 58 and lines 54 and 55. In order to remove accumulations of fine solids in accumulation zone 21 or within feeder zone housing 24, a portion of the liquid products are recirculated through these zones into reservoir 43 where they are allowed to separate as desired. Clear liquid products of eduction are removed from the upper part of reservoir zone 43 by means of line 50 and are pumped by means of pump 51 through line 52 controlled by valve 53 and divided into two portions, the first of which may be passed into the bottom of accumulation zone 21 through line 54 controlled by valve 55 to assist normal fines removal previously described and the second of which enters the upper portion of feeder housing 24 by means of line 56 controlled by valve 57. The first portion of oil circulates upward through the body of liquid in accumulation zone 21 suspending fine particles which then flow through line 44 for deposition in reservoir 43. The second portion of oil passes into feeder housing 24 and escapes therefrom through line 58 controlled by valve 59 into reservoir zone 43. The fine solids settling in feeder housing 24 are directed to a point immediately below the oil entry point of line 58 by means of conical baffle 60 and are thus swept out of housing 24 through line 58 and deposited in reservoir 43.

The liquid products of eduction are continuously removed from reservoir 43 by means of line 61 controlled by automatic control valve 62 which in turn is actuated by liquid level controller 63. The rate of oil removal from reservoir 43 is equal to rate of oil eduction maintaining a dynamic fluid equilibrium in the system in which liquid level 41 is such that a seal is maintained across baffle 23. The oil product thus formed is sent by means of line 61 to storage or further processing facilities not shown.

Under the influence of blower 40 gaseous products of eduction and of combustion are withdrawn from accumulation zone 21. In one modification, these gases may be subjected to the effects of sonic and ultrasonic mechanical vibrations to increase the degree of separation of normally liquid products from the gas phase. In this modification valve 47 is closed and valve 49 is opened permitting the gases and liquids to flow simultaneously from accumulation zone 21 through line 44 controlled by valve 45 into accumulation zone 43. These gases and liquids enter reservoir zone 43 beneath baffle 64 and must of necessity pass around the left end of this baffle 64 into vibration chamber 65. During passage of the gas products through vibration chamber 65 these gases are subjected to intense sonic and ultrasonic mechanical vibrations transmitted through the gas which are introduced into chamber 65 by sound generator 66. It is preferable that this sound generator be capable of generating high intensity sonic or ultrasonic vibrations having intensities of as high as about 175 decibels in the frequency range of from about 1000 cycles per second to as high as 200,000 cycles per second or higher. Although sonic vibrations may be generated in several ways, namely through the action of alternating currents on crystals showing the piezoelectric effect, or the action of alternating current on coils wound over metal cores, it is preferable, because of the high intensity vibrations required, that generator 66 be of the type which generates the required vibrations through the use of a rotary mechanical device of the siren type. By means of this type of device mists comprising suspended liquid particles of minute size may be violently vibrated with vibrations of intensity sufficient to cause agglomeration of these mists into liquid particles of sufficiently large size to permit ready separation from the gas by gravity or centrifugal means. Such separated shale oil flows through baffle 64 via line 68 to the body of liquid in reservoir 43. The gas phase removed from accumulation zone 21 contains some finely divided liquid particles similar to a fog or mist. It is desirable to recover these normally liquid constituents. The preferred modification for mist recovery is one in which the gases are first subjected to centrifugal separation as in blower 40 followed by the sonic vibration treatment to agglomerate any remaining suspended liquid particles.

The gas containing some remaining agglomerated liquid particles passes from vibration chamber 65 through line 48 controlled by valve 49 into blower 40 wherein besides drawing gases from reservoir 43 effects a further centrifugal agglomeration of the particles. The liquid thus recovered is drawn from the case of blower 40 by means of line 67 and is returned to the main liquid body present in reservoir 43. The gases pass, under pressure developed by blower 40, through line 69 controlled by control valve 70 to centrifugal separator 71 wherein remaining traces of suspended particles are recovered. These separated particles drain by means of line 72 back into reservoir 43 with the main oil product. The gases, now free of suspended material, pass by means of line 73 to storage or further processing not shown. This gas comprises a mixture of flue gas constituents as well as educted hydrocarbon constituents and is worthy of separation to recover the individual components. Such separation may be effected by absorption, distillation, selective adsorption, or other means. The separated flue gases may be recycled for passage downwardly through the burning zone supplementing the volume of hot eduction medium employed in zone C, and the remainder may be vented. The hydrocarbon constituents may be employed as fuel or any chemical synthesis or for other use.

Continuous process control may be maintained by controlling the rate at which the solids to be treated are introduced into the kiln, by controlling the rate at which the product gases are removed which determines the rate of oxygen-containing gas introduction, by controlling the composition of gases introduced into the top of the kiln, and the like. These control methods may be used in combination with one another, if desired, or individually. These control methods used in conjunction with the method for agitating the solids in the ash and burning zones result in a process of unusually high efficiency for the treatment of oil-bearing or oil-producing solids.

Control of the solids input rate by the reciprocating vertically-acting solids feeder has been described above and control of the product gas removal rate may be obtained readily by adjustment of control valve 69 on the outlet line of blower 40. The variation of the inlet gas composition may be widely varied by a number of procedures. The oxygen-containing gas may be enriched with added oxygen to raise the combustion temperature and the combustion rate. If desired, air, oxygen-enriched air, or pure oxygen may be employed. In gasification operations, pure oxygen and steam are desirable as the reactant gas mixture introduced. In other modifications, flue gas or other gases including educted hydrocarbons may be recycled through the treating zone to provide a measure of heat control. Usually, sufficient carbonaceous residue remains after educting shale oils and gases to provide more than the required heat and air alone is introduced. To reduce the temperature and rate of combustion, steam or flue gas may be recycled in the proper ratio to give the desired reduction. Gases containing from as low as 10% to as high as 90% recycled gas or steam may be used with air depending upon the particular operation. Control of the burning zone may also be affected by the withdrawal or introduction of gases through the conduit in the plow mechanism, and by the cooling effect resulting from circulation of the fluid heat transfer medium within the plows as hereinafter more fully described.

In one desirable modification, the flow rate at which gases are removed from accumulation zone 21 is maintained at a constant value by means of flow recorder controller 74 which in turn actuates control valve 69 positioned in the outlet line of blower 40. The rate at which oil shale or other oil-producing solids passes upwardly through the treating zone is then controlled by temperature recorder controller 75 acting to control the solids delivery rate of the feeder mechanism in feeder zone 24 in accordance with the position in kiln 10 of burning zone B. Thus, when a solids flow rate which is too low for a required output of gas is encountered, the burning zone present in zone B tends to lower its position. This condition is detected by temperature recorder controller 75 through thermocouple point 76 and the solids feeder is actuated to increase the solids flow rate thus restoring the burning zone B to its desired position in kiln 10.

In another modification of control, the solids delivery rate of the feeder is maintained at a constant value and temperature recorder controller 77 actuated by thermocouple point 78 varies the rate at which gases are withdrawn from accumulation zone 21. Thus, when the position of burning zone B tends to change above or below its desired position, the condition is detected by thermocouple 78 which increases or decreases the gas flow rate by controlling blower 40 and either increasing or decreasing the burning rate appropriately to restore the position of the burning zone to its desired position. The temperature gradient in the kiln reaches a maximum in the combustion zone and the thermocouple is preferably positioned above or below this maximum point. Two couples may be used, one above and one below in this service.

It is also possible to operate the apparatus with the combustion zone at the uppermost part of the kiln. This permits direct heat loss principally by radiation from the hot shale particle and allows deeper penetration of the plows into the combustion zone.

The process and apparatus of the present invention as shown in Figure 1 eliminates two of the principal operation difficulties which manifest themselves in oil shale retorting. The first of these is a condition characteristic of oil shales with relatively high oil contents, such as about 40 U. S. gallons per ton and higher. This difficulty is one in which the carbon content of the spent shale is sufficiently high to generate an excess of heat during the carbon burn-off step in the formation of the hot eduction medium to cause incipient fusion of the shale ash. These slagging conditions are such to inhibit the free flow of oxygen-containing gas downwardly through the burning zone. The second difficulty encountered in processes involving burning the carbonaceous shale residue is one peculiar to oil-shales containing relatively low oil contents, that is, less than about 30 U. S. gallons per ton. This condition involves the excessive formation of dust from ashes produced in the burning zone. This dust is easily suspended in the gas flow and tends to smother or otherwise inhibit the free burning of the carbonaceous residue in the burning zone below. These difficulties have been substantially eliminated by the apparatus shown in cross section in the upper portion of the treating zone shown and previously described in Figure 1. This apparatus subjects the ash in ash zone A and particularly the burning residue in burning zone B to moderate agitation by the action of rotary plows extending downwardly into the bed. These plows rotate about the center vertical axis of the kiln. The effect of this agitation is to prevent slagging conditions in the burning zone B from inhibiting free gas flow through the system when rich oil shales and the like are treated. The plows are further adapted to remove a portion of the heat from burning zone B which increases the control maintained over the position of the burning zone by preventing it from rising to the top of the bed. This effect is achieved since the solids are maintained in an agitated condition and a free flow of oxygen-containing gas downwardly therethrough is insured. For processing domestic oil shales, slagging conditions are encountered between about 2,000° F. and about 3,000° F., depending upon the mineral constitution of the material. In this type of operation the burning zone is maintained between a transverse plane above the lower extremities of the plows and a transverse plane approximately at the position of thermocouples 76 and 78. This lower extremity is somewhat variable since the control temperatures of temperature recorder controller 75 and 77 may be varied.

In another modification, thermocouples 76 and 78 may actuate controllers to vary the rate of oxygen-containing gas and steam introduction to control the burning zone position and its temperature.

The rotary plow mechanism is further provided with a conduit which is operated under a pressure less than that existing within the apparatus and consequently a flow of gas from the bed of ashes in ash zone A into the aforementioned conduit occurs permitting the removal of a substantial proportion of fine ashes which are detrimental to the maintenance of smooth burning conditions in burning zone B.

Thus, the combination apparatus shown in Figure 1 is well adapted to the efficient recovery of gaseous and liquid products of eduction and to the smooth control of the eduction process regardless of the oil content of the oil-bearing or oil-producing solids which are employed.

The mechanism for agitating the solids in ash zone A and combustion zone B is shown as rotary agitating mechanism 34. This mechanism is provided with a system of cross arms 81 to which are attached plows 82 extending downwardly through ash zone A. Plows 82 are hollow and provided with means for the circulation of a heat transfer medium. Plows 82 are further provided at their lower extremities with abrasion resistance and heat resistant tips of alloy steel, carbide, or other material. Cross arm 81 is integrally attached to shaft 83 by means of which the rotary motion is transmitted from a suitable driving means not shown. Shaft 83 is hollow and connected with the conduit previously described in plows 82 by means of which dust particles are withdrawn from ash zone A. This suspension of particles passes upwardly through the conduit into cross arm 81, upwardly through shaft 83, through rotary coupling 84, and through line 85 controlled by valve 86, and is introduced by means of blower 87 through line 88 controlled by valve 89 to centrifugal separator 90 wherein suspended fine ash particles are separated. The separated ash fines pass via line 91 controlled by valve 92 to be combined with ash fines separated continuously from an especially designed case in blower 87 via line 93 controlled by valve 94. These ashes are disposed of together with ashes removed via conduit 37 from chamber 36 previously described. The gas, freed of suspended ash fines, is removed from separator 90 via line 95 and are disposed of, if desired, or recirculated into chamber 36 with incoming oxygen-containing gas through line 38 controlled by valve 39.

During the operation in which ash slagging problems exist it is generally unnecessary to operate the evacuating system just described since the evacuating system provides means for ash dust removal. Such dust is in most cases only formed at lower temperatures with lean shales or other solids when slagging is not often encountered. In this case, valve 86 may, if desired, be closed and flue gas or air or steam or other gas may be introduced via line 96 controlled by valve 97 to flow in the reverse direction through the evacuating system described above. These gases, therefore, pass downwardly through shaft 83 and enter the burning zone directly through the openings provided in plows 82. This reversal of gas flow serves to introduce cool oxygen-containing gas directly into the burning zone, to control the position of the burning zone, and prevent undue heating of the evacuation conduit.

Figure 2:
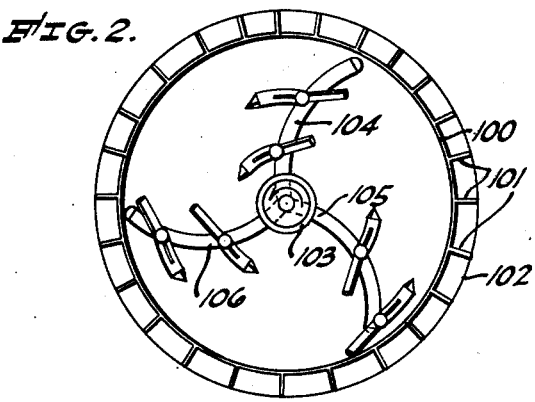
Figure 2 shows a plan view of the upper portion of the vertical kiln in which the apparatus required for ash agitation is shown.

Referring now more particularly to Figure 2, a plan view of the ash agitating mechanism is shown. In this figure kiln shell 100 is shown provided with radial cooling fins 101 as well as jacket 102 providing open vertical channels for cooling gas flow described above. Shaft 103 is indicated to which are attached cross arms 104, 105 and 106 which support the plows for agitation of the solids. To each of the aforementoned cross arms, two plows are attached in this modification of apparatus. The assembly rotates in counter-clockwise direction, although the direction of rotation is not critical, continuously agitating the solids.

Figure 3:
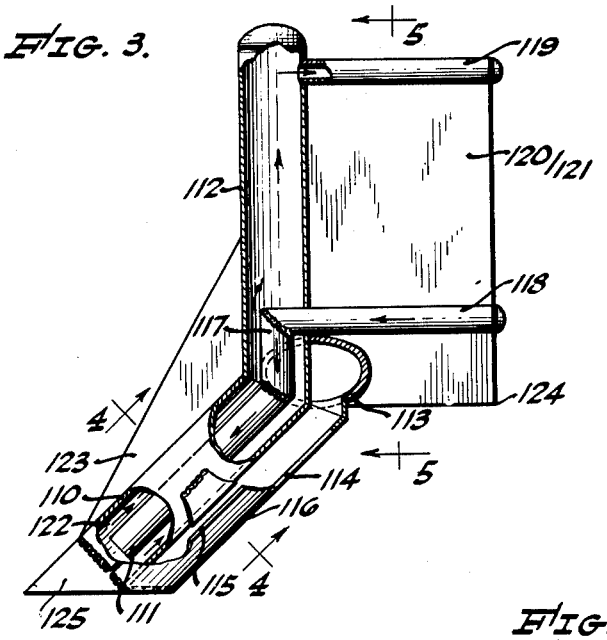
Figure 3 shows a vertical cross section of the plows employed to agitate the ashes present in the upper portion of the vertical kiln and by means of which a part of the heat generated in the burning zone may be removed and finely divided ash particles or fines may also be evacuated.

Referring now more particularly to Figure 3, a vertical cross section of the plow assembly is shown in which the means for cooling and the means for evacuating ash fines are clearly shown.

Figure 4:
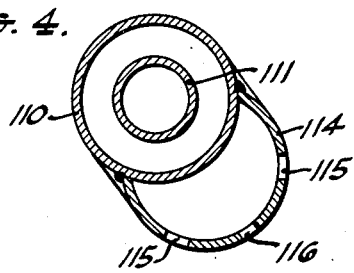
Figure 4 shows a cross section view of the plow showing the nature of construction.

The lower portion of the plow consists of outer cylinder 110 provided with an inner concentric cylinder 111 of smaller diameter extending nearly to the lower extremity of cylinder 110. The lower extremity of the plow is provided with a heat and abrasion resistant point 125 which is integrally attached to outer cylinder 110 and also the lower extremity of conduit 114. Intersecting at an angle with outer cylinder 110 is vertical cylinder 112 which is integrally attached to leading edge of cross arm 113. Cross arm 113 comprises a header for the evacuation conduits 114 attached to the plows described above. This intercommunicates directly with evacuation conduit 114 which is integrally attached to the trailing side of the plow member proper. Conduit 114 is provided with a series of apertures which in this modification are slots 115 and 116 through which gases are drawn from the ash bed to assist in removing ash fines therefrom. The cross sectional view showing the relative position of cylinder 110, cylinder 111 and conduit 114 is shown in Figure 4 wherein these parts are designated with the same numbers.

Figure 5:
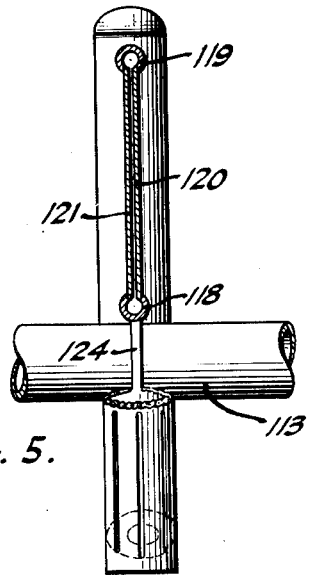
Figure 5 shows a cross section of an elevation view of the plow more clearly showing the construction developed to permit ready heat dissipation.

Inner cylinder 111 communicates directly with cylinder 117 and header 118 and vertical cylinder 112 communicates with cylindrical header 119. Headers 118 and 119 are parallel and extend at right angles from cylinder 112. A pair of parallel spaced plates 120 and 121 are integrally attached to tubes 118 and 119 as is more clearly shown in Figure 5 in which like members are designated with the same numbers thus forming a radiation chamber. Of plates 120 and 121 as shown three as normally viewed are closed forming a closed system through which a heat transfer medium may be circulated. This transfer medium flows through cylinder 118 into cylinder 117, through inner cylinder 111, downwardly into the plow, upwardly through annular space 122 between cylinders 110 and 111 wherein the heat transfer medium is indirectly heated, upwardly through cylinder 112 and into cylinder 119, and subsequently downwardly between plates 120 and 121 through the radiation chamber wherein the heat transfer medium loses a substantial portion of its heat by convection and conduction and predominantly by radiation to the relatively cold walls of chamber 36 shown in Figure 1. The circuit is then completed when the cooled heat transfer medium flows again through header 118 to repeat the cycle. The radiation chamber, the volume between plates 120 and 121 has a large surface to volume ratio and is situated entirely above the bed level. An efficient cooling is thus obtained.

To provide mechanical rigidity to the system cross arm 113 is preferably of an oval shape having a horizontal major axis. The rigidity is further increased by the incorporation of gusset plate 123 between outer cylinder 110 and vertical cylinder 112. Plate 124 is provided between cross arm 113 and cylinder 118 to impart rigidity to the structure and also to impart to the ashes a radial motion wherein they are spilled over the upper edge of the eduction kiln. The angle between the vertical plane of plates 120 and 121 with respect to the cross arm and with the plow is clearly shown in the plan view of Figure 2 where it may be seen that through a counterclockwise rotation of the ash agitation system ashes may be given a radial motion and progressively moved across the top of the ash bed to the edge of kiln 100 shown in Figure 2. By this method the level of ashes is maintained and the depth of the ash bed is kept constant thereby maintaining an even distribution of flow of oxygen-containing gas downwardly through the ash zone into burning zone B. This contributes to stable operation and uniformity of burning.

The heat transfer medium employed in this system is preferably one which will withstand temperatures in the range of from 1,000° F. to 2,000° F. while molten without exerting substantial vapor pressures or without decomposing. Materials which satisfy these requirements include fusible metals such as metal alloys principally, and pure metals notably the alkali metals. It is preferable to employ such metals as sodium or potassium since these metals have particularly broad ranges between melting point and boiling point. Sodium has been found particularly well adapted to this service of dissipating heat from the lower portion of the plow by radiation from the radiated surfaces, plates 120 and 121 shown in Figures 3 and 5, positioned at the upper part of the radiating mechanism. In lower temperature service such as in other applications than the ones shown, other fluids such as molten alloys of bismuth, tin, lead, zinc, antimony and the like may be used. Molten salts such as eutectic mixtures having the requisite melting point may be used.

As an example of typical operation of the improved apparatus according to this invention, the following data are given:

Example I

The apparatus had a capacity of 1.75 tons of crushed shale per day. The oil shale was obtained from the Parachute Creek District of Garfield County, Colorado. The shale was introduced at a rate of 103.5 pounds per hour through the oil seal, which had a temperature of about 120° F. A total quantity of 587.3 pounds of shale was fed during the run and from this material was obtained 100.7 pounds of shale oil and 342.1 pounds of ashes. The remaining material was produced as gas.

The shale passed into the kiln at a temperature of 100° F. and the oil and gasses were educted at temperatures below 850° F. The maximum temperature in the burning zone was 2250° F. and the ash was removed from the kiln at 600° F. after preheating incoming air.

The ash agitating mechanism was rotated at slightly less than one revolution per minute and an unimpeded air flow through the bed of ash and a steady carbon burn-off was maintained at all times. The plows and radiation chambers were partially filled with metallic sodium to assist in heat dissipation. No trouble was encountered due to ash slagging as before when no ash agitation had been employed.

The gas circulating through the kiln jacket was vented to the atmosphere at a temperature of about 275° F. to 285° F. during the run.

Air was introduced through the evacuation conduit directly into the kiln to aid cooling of the plows.

Example II

The apparatus above described was applied to the coking of bituminous coal. The coal contained 79% carbon and was introduced at a rate of 1.63 tons per day or 136 pounds per hour. Controlled quantities of air were introduced limiting the maximum temperature to about 1300° F. The coke yield was 1.22 tons per day or 102 pounds per hour. The tar yield was about 20.4 gallons per day and about 95 cubic feet per hour of gas was produced which had a heating value of about 575 B. t. u. The operation was smooth and easily controlled in all respects and the coke produced was of high quality.

*Example III*

A coke, analyzing about 95% carbon, was introduced into the apparatus for gas production at a rate of 0.96 ton per day, 80 pounds per hour. A mixture of air and 44 pounds of steam per hour was introduced, the quantity of air added being controlled to maintain a gasification temperature of between 1900° F. and 2000° F. It was found that the gasification zone or combustion zone was easily maintained at its desired position. A producer gas containing about 8% carbon dioxide, 24% carbon monoxide, 9% hydrogen, and nitrogen was obtained at a rate of about 750 standard cubic feet per hour.

The process of this invention may be quite widely varied. The hydraulic drive of the positive solids feeder shown in Figure 1 may be altered to be driven with gears so that the reciprocating motion of the piston is coordinated with the oscillatory motion of the cylinder. It is preferred, however, to employ the hydraulic driving means shown. In such operations with moving cylinders, it is convenient to provide for the motion of the liquid in which the cylinders operate. This may be accomplished by a by-pass line between accumulation zone 21 and feeder zone 24, such as by lines 54 and 56 controlled by valves 55 and 57.

The process and apparatus of this invention as previously mentioned is principally directed toward the recovery of hydrocarbon gases and liquids from oil-producing and oil-containing solids. The process and apparatus has been particularly successful in the treatment of oil shales wherein a carbonaceous residue remains in the form of spent shale which is burned to supply heat for the process. In some instances, however, there may be insufficient carbon present in this residue to provide heat requirements for eduction. In this case heat may be supplied from an external source by burning a portion of the educted gases or even by supplying fuel gas from separate sources. In general, however, this is not necessary since with most shales treated, such as those from Colorado containing from as low as 20 to as high as 70 U. S. gallons per ton of oil, the amount of carbonaceous residue was sufficient to supply the required heat.

It is sometimes desirable to directly contact the ashes present in ash zone A of Figure 1 with either water or steam which is introduced with the oxygen containing gas. The introduction of steam serves principally to supplement the volume of hot eduction medium employed in educting gases and liquids from the solids. The introduction of water in direct contact with hot ashes serves also to provide quantities of steam in addition to removing a substantial proportion of the sensible heat of ashes discharged.

The term "eduction" as employed in this specification is intended to include any means of treatment of oil-bearing or oil-containing solids including coals whereby oil is obtained therefrom.

In the practice of this invention the solid to be treated is preferably crushed to particle sizes between about 0.5 and 1.5 inches, although larger particles may be treated. It is characteristic of the apparatus of this invention that particles of quite small dimensions may be efficiently treated simultaneously with the larger particles. Solids fines as small as about 50 mesh and smaller may be handled.

The process and apparatus of this invention may be applied to the recovery of oil from other oil-bearing or oil-producing solids besides oil shale including various types of coal, tar sand, oil soaked diatomite, and the like. It may also be applied to the coking of coals, lignite, and similar materials. The process and apparatus is further adaptable substantially as described to the gasification of carbonaceous oil-bearing or oil-producing solids including coal, spent oil shale, tar sand, coke, cellulose-like materials such as peat, agricultural by-products such as corn husks, bagasse, and the like. The simultaneous eduction of oils and gas and gasification of the carbonaceous residue to form fuel or synthesis gas is also within the broad aspect of this invention.

A particular embodiment of the present invention has been hereinabove described in considerable detail by way of illustration. It should be understood that various other modifications and adaptations thereof may be made by those skilled in this particular art without departing from the spirit and scope of this invention as set forth in the appended claims.

I claim:

1. An apparatus for the recovery of oils and gases from oil-bearing solids which comprises a vertical treating kiln, a vertically acting reciprocating feeder and an accumulation chamber communicating with said treating kiln, means for drawing gases downwardly through said kiln, means for removing solids from the upper extremity of said kiln, and mechanical means comprising a scraper section for moving ashes from the top of said kiln into said removal means, a plow section extending below said scraper section deep into the kiln for continuously agitating the solids in the upper portion of said kiln to provide a substantially unimpeded gas flow therethrough, and a radiation cooling section extending above said scraper section, said plow section extending below the level of solids in said kiln, said scraper section extending at least partially below said solids level, and said radiation section extending entirely above said solids level.

2. An apparatus according to claim 1 wherein said mechanical means comprises a rotating vertical shaft integrally attached to a plurality of horizontal cross arms, said cross arms supporting a series of hollow plows extending downwardly at an angle from said cross arms to engage and agitate the solids in said kiln.

3. An apparatus according to claim 2 wherein said plows are hollow and contain a concentric tube, the two conduits thus formed communicating with a hollow radiation chamber to form a closed system, and a fusible metal in said closed system capable of withstanding temperatures in the range of about 1000° F. to 2000° F. while molten without exerting a substantial vapor pressure.

4. An apparatus according to claim 3 wherein said closed system is filled with metallic sodium molten under temperatures of operation and is adapted to allowing ready natural thermal circulation of said sodium through the conduits within said plow and said radiation chamber whereby heat is transferred from said solids.

5. An apparatus according to claim 2 wherein said mechanical means for continuously agitating said solids is provided with an evacuation conduit on the trailing edge of said plows, said evacuation conduit having an axis parallel to that of said plow, said conduit further being provided with perforations through which gases may pass from contact with said solids, said evacuation conduit communicating with said hollow cross arms, said cross arms communicating with a hollow drive shaft, means for evacuating gases through said conduit to suspend and remove fine solid particles formed during agitation.

6. An apparatus according to claim 1 in which the plow section and the radiation section are both hollow and intercommunicating and are filled with a material which is liquid at the temperature of operation.

CLYDE H. O. BERG.

References Cited in the file of this patent

UNITED STATES PATENTS

| Number | Name | Date |
|---|---|---|
| 1,469,628 | Dundas et al. | Oct. 2, 1923 |
| 1,607,240 | Davis | Nov. 16, 1926 |
| 1,607,241 | Davis et al. | Nov. 16, 1926 |
| 1,698,907 | Carr | Jan. 15, 1929 |
| 1,716,667 | Schilling et al. | June 11, 1929 |
| 1,793,838 | Carr et al. | Feb. 24, 1931 |
| 1,922,321 | Parker | Aug. 15, 1933 |
| 2,072,486 | Smith | Mar. 2, 1937 |
| 2,238,792 | Hanawalt | Apr. 15, 1941 |
| 2,300,761 | Amy | Nov. 3, 1942 |
| 2,364,492 | Tuttle | Dec. 5, 1944 |
| 2,426,848 | Tuttle | Sept. 2, 1947 |
| 2,501,153 | Berg | Mar. 21, 1950 |